United States Patent
Jang

(10) Patent No.: US 8,164,204 B2
(45) Date of Patent: Apr. 24, 2012

(54) ELECTRICAL GENERATOR APPARATUS, PARTICULARLY FOR USE ON A VEHICLE ROADWAY

(76) Inventor: Jack Shihzong Jang, Delaware, OH (US)

(*) Notice: Subject to any disclaimer, the term of this patent is extended or adjusted under 35 U.S.C. 154(b) by 0 days.

(21) Appl. No.: 13/075,245

(22) Filed: Mar. 30, 2011

(65) Prior Publication Data
US 2011/0187125 A1 Aug. 4, 2011

Related U.S. Application Data

(60) Provisional application No. 61/463,477, filed on Feb. 17, 2011.

(51) Int. Cl.
F02B 63/04 (2006.01)
(52) U.S. Cl. ......................................................... 290/1 R
(58) Field of Classification Search .................. 290/1 R, 290/1 C; 60/325, 327, 398; 417/229; 404/71; 180/53.61
See application file for complete search history.

(56) References Cited

U.S. PATENT DOCUMENTS

| | | | | |
|---|---|---|---|---|
| 3,859,589 A | * | 1/1975 | Rush | 322/40 |
| 3,892,136 A | * | 7/1975 | MacDonald | 74/14 |
| 4,004,422 A | | 1/1977 | Le Van | |
| 4,238,687 A | | 12/1980 | Martinez | |
| 4,239,975 A | * | 12/1980 | Chiappetti | 290/1 R |
| 4,250,395 A | * | 2/1981 | Lundgren | 290/1 R |
| 4,339,920 A | | 7/1982 | Le Van | |
| 5,272,378 A | | 12/1993 | Wither | |
| 5,355,674 A | | 10/1994 | Rosenberg | |
| 6,494,144 B1 | * | 12/2002 | Perez Sanchez | 104/287 |
| 6,767,161 B1 | * | 7/2004 | Calvo et al. | 404/71 |
| 6,858,952 B2 | | 2/2005 | Gott | |
| 7,067,932 B1 | | 6/2006 | Ghassemi | |
| 7,098,553 B2 | | 8/2006 | Wiegel | |
| 7,102,244 B2 | | 9/2006 | Hunter, Jr. | |
| 7,541,684 B1 | | 6/2009 | Valentino | |
| 7,589,428 B2 | | 9/2009 | Ghassemi | |
| 7,629,698 B2 | | 12/2009 | Horianopoulos et al. | |
| 7,830,071 B2 | | 11/2010 | Abramovich et al. | |

(Continued)

FOREIGN PATENT DOCUMENTS

AU 2002302091 A1 6/2004
(Continued)

Primary Examiner — Julio Cesar Gonzalez
(74) Attorney, Agent, or Firm — The Law Office of Patrick F. O'Reilly, III, LLC

(57) ABSTRACT

An electrical generator apparatus, which is configured to convert an external actuation force applied by a vehicle traveling on a roadway into electrical energy, includes a rotatable top portion adapted to receive the external actuation force applied by the vehicle traveling on the roadway; a plurality of linkage members operatively connected to one another in succession, the rotatable top portion being operatively coupled to a first one of the plurality of linkage members operatively connected to one another in succession; a first wheel operatively coupled to a last one of the plurality of linkage members operatively connected to one another in succession; a second wheel operatively coupled to the first wheel via a tangential coupling element; a rotatable shaft operatively coupled to the second wheel; at least one flywheel operatively coupled to the rotatable shaft; and at least one electrical generator operatively coupled to the rotatable shaft, the electrical generator adapted to convert a rotational movement of the rotatable shaft into electrical energy. The second wheel of the electrical generator apparatus is configured to rotate at a higher angular velocity than the first wheel.

9 Claims, 10 Drawing Sheets

Solid Lines-- Load-Off Position
Dashed Lines-- Load-On Position (FIRST EMBODIMENT)

U.S. PATENT DOCUMENTS

| Publication | Date | Inventor | Class |
|---|---|---|---|
| 2002/0089309 A1 | 7/2002 | Kenney | |
| 2004/0042852 A1* | 3/2004 | Alperon | 404/71 |
| 2004/0160058 A1* | 8/2004 | Gott et al. | 290/1 R |
| 2005/0089370 A1 | 4/2005 | Painchaud | |
| 2005/0253459 A1 | 11/2005 | Cole | |
| 2006/0147263 A1 | 7/2006 | Hughes et al. | |
| 2006/0152012 A1 | 7/2006 | Wiegel | |
| 2007/0264081 A1* | 11/2007 | Chiu | 404/71 |
| 2009/0179430 A1 | 7/2009 | Mahawili | |
| 2010/0133855 A1* | 6/2010 | Daya | 290/1 R |
| 2010/0288074 A1 | 11/2010 | Becerra | |
| 2011/0215593 A1* | 9/2011 | Chang et al. | 290/1 R |

FOREIGN PATENT DOCUMENTS

| | | |
|---|---|---|
| CA | 2526213 A1 | 5/2007 |
| CA | 2545843 A1 | 11/2007 |
| CA | 2555654 A1 | 2/2008 |
| CA | 2627833 A1 | 10/2009 |
| CA | 2 654 192 | 4/2010 |
| CN | 2133687 Y | 5/1993 |
| CN | 101042122 A | 9/2007 |
| CN | 201148944 Y | 11/2008 |
| CN | 201339553 Y | 11/2009 |
| DE | 4034219 A1 | 4/1992 |
| EP | 1519011 A1 | 3/2005 |
| EP | 2065596 A1 | 6/2009 |
| FR | 2608855 A1 | 6/1988 |
| GB | 1 332 202 | 10/1973 |
| GB | 1602761 A | 11/1981 |
| GB | 2275828 A | 9/1994 |
| GB | 2254111 A | 11/1994 |
| GB | 2359593 A | 8/2001 |
| GB | 2409112 A | 6/2005 |
| GB | 2461860 A | 1/2010 |
| IE | 20080012 A2 | 9/2010 |
| JP | 2006214427 A | 8/2006 |
| JP | 2008167546 A | 7/2008 |
| KR | 1020040063875 A | 7/2004 |
| WO | 9516133 A1 | 6/1995 |
| WO | 99/66202 | 12/1999 |
| WO | 2004076747 A2 | 9/2004 |
| WO | 2010042777 A2 | 4/2010 |
| WO | 2010088314 A2 | 8/2010 |

* cited by examiner (FIRST EMBODIMENT)

Solid Lines -- Load-Off Position
Dashed Lines -- Load-On Position

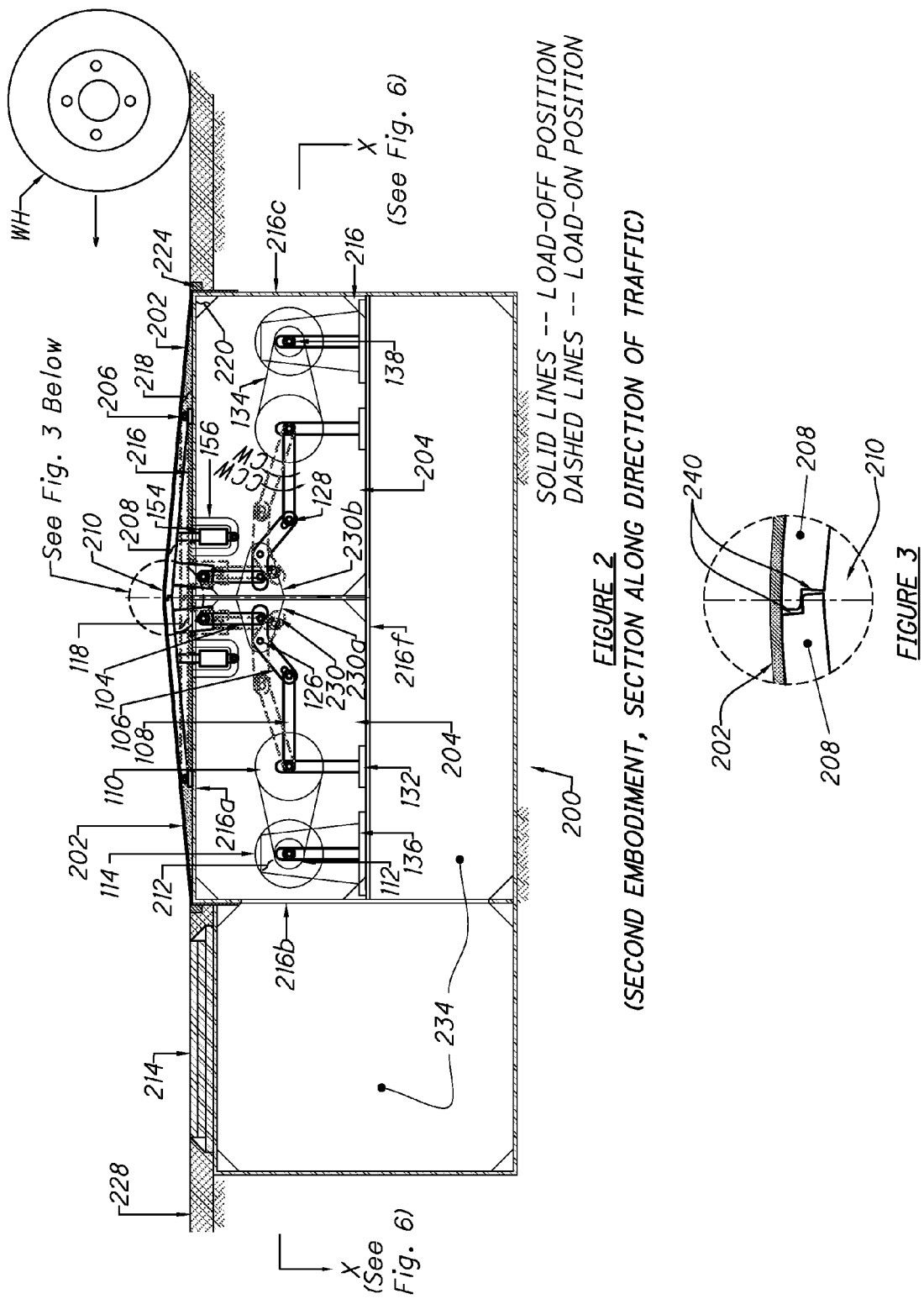

(SECOND EMBODIMENT, TOP OF HOUSING WITH RAMP PLATES SHOWN)

(SECOND EMBODIMENT, TOP OF HOUSING WITH RAMP PLATES REMOVED)

(SECOND EMBODIMENT, SCHEMATIC SECTION Y-Y, SCHEMATIC SECTION Z-Z SIMILAR)

(SECOND EMBODIMENT, RELATIVE SIZES OF A SEMI-TRUCK AND THE APPARATUS)

(SECOND EMBODIMENT, RELATIVE SIZES OF A CAR AND THE APPARATUS)

(ELECTRICITY COLLECTION SYSTEM)

(FLYWHEEL SECTION)

SECTION A-A (FLYWHEEL)

SIDE VIEW

ELECTRICAL GENERATOR APPARATUS, PARTICULARLY FOR USE ON A VEHICLE ROADWAY

CROSS-REFERENCE TO RELATED APPLICATIONS

This patent application claims priority to, and incorporates by reference in its entirety, U.S. Provisional Patent Application No. 61/463,477, entitled "Electrical Generator Apparatus, Particularly For Use On a Vehicle Roadway", filed on Feb. 17, 2011.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to electrical generating apparatuses. More particularly, the invention relates to an electrical generator apparatus that is designed to capture the otherwise wasted kinetic energy of moving vehicles travelling on a roadway, thereby resulting in the more efficient use of energy resources. The present invention materially contributes to the efficient utilization and conservation of petroleum-based energy resources by making better use of the energy consumed by vehicles.

2. Description of Related Art

In recent years, there has been a worldwide focus on the more efficient utilization and conservation of energy resources. Fossil fuels, such as coal, oil, and natural gas, take thousands of years to form naturally, and thus, cannot be replaced nearly as fast as they are being consumed. It is well known that gas-driven automobiles are one of the largest consumers of oil in the world. While automotive manufacturers are actively developing technologies that are designed to increase the fuel efficiency of their vehicles (e.g., hybrid gas-electric vehicles), these technologies typically overlook one important source of additional energy, namely the energy that can be produced by the interaction between the vehicles and the roadway on which they travel.

In the major countries throughout the world, including the United States, the automobile is the primary means of transportation. The automobiles in these countries travel along a network of roadways so that their occupants can be transported from one location to another. These roadways, particularly those disposed in and around large cities, carry a relatively steady stream of traffic during a significant portion of each day. Because the vehicles travel along these roadways at considerable speeds, they possess a great deal of potential energy that can be converted into kinetic energy for producing useful work. For example, the energy produced by the kinetic energy of moving vehicles advantageously could be used for powering roadway lighting systems, toll booths, and rest stops along an interstate highway. Unfortunately, in the past, this vast source of free, sustainable energy from moving vehicles has rarely been utilized.

While others have designed different systems for extracting kinetic energy from moving vehicles, the related art devices have numerous limitations and drawbacks. It is highly probable that the underutilization of the unused kinetic energy of moving vehicles can be attributed to the limitations present in the related art. For example, some of these traffic-actuated systems employ complex fluid-based systems that are expensive and difficult to implement. In addition, these fluid-based systems are not easy to maintain once they are installed within the roadway. Other traffic-actuated systems of the related art employ elements that substantially deviate from the general contour of the roadway, and thus, disturb the natural flow of traffic by creating significant vehicle vibrations, as well as potentially creating a great deal of unrest when motorists pass thereover. Several of these related art systems use geometric shapes that resemble speed bumps. While such systems could be utilized in areas where only low speeds are generally encountered, such as parking lots, it is obvious that these systems would be unsuitable for any roadways on which vehicles are travelling at a high rate of speed, such as a freeway or highway, where the potential for harvesting energy produced by moving vehicles is the greatest. Still other traffic-actuated systems taught by the related art utilize an arrangement of components that are readily susceptible to fatigue failure. Some of these related art systems use a plurality of meshed gears to harvest the kinetic energy imparted on the roadway by the moving vehicle. Because these gears will be subjected to millions of cycles in a region of high traffic, the gear teeth disposed on the outer surface thereof will likely undergo failure.

Thus, there is a great need for an electrical generator apparatus, which is particularly for use on a vehicle roadway, that utilizes a simple and easily serviceable arrangement of components, readily integrates into a typical roadway without substantially disrupting the general contour thereof, and employs a plurality of components that are less susceptible to fatigue failure.

BRIEF SUMMARY OF THE INVENTION

Accordingly, the present invention is directed to an electrical generating apparatus, which is designed for use on a vehicle roadway, that substantially obviates one or more problems resulting from the limitations and deficiencies of the related art.

A first object of the present invention is to provide an electrical generating apparatus for use on a roadway that materially contributes to the more efficient utilization and conservation of petroleum-based energy resources by harvesting the otherwise wasted kinetic energy of moving vehicles.

A second object of the present invention is to provide an electrical generating apparatus for use on a roadway that can be easily integrated into a typical roadway without substantially disturbing the normal contour of the pavement so that motorists are not alarmed by the presence of the apparatus.

A third object of the present invention is to provide an electrical generating apparatus for use on a roadway that utilizes a simple arrangement of mechanical components to transfer an external actuation force applied by a vehicle to one or more electrical generators.

A fourth object of the present invention is to provide an electrical generating apparatus for use on a roadway that utilizes simple components that are less susceptible to fatigue failure than the gear systems and cam mechanisms of the related art.

A fifth object of the present invention is to provide an electrical generating apparatus for use on a roadway that does not utilize any complex fluid or hydraulic systems.

A sixth object of the present invention is to provide an electrical generating apparatus for use on a roadway that provides an auxiliary source of electrical energy for powering various devices, such as roadway lights, toll booths, and rest stops along interstate highways.

A seventh object of the present invention is to provide an electrical generating apparatus for use on a roadway that is suitable for use on roadways where vehicles are travelling at a high rate of speed, such as freeways and highways.

The aforedescribed objects are merely illustrative in nature. Additional objects and advantages of the present invention will be apparent from the following detailed description, the accompanying drawings, and the appended claims.

To achieve one or more of these objects and advantages, in accordance with a first aspect of the present invention, there is provided an electrical generator apparatus configured to convert an external actuation force applied by a vehicle traveling on a roadway into electrical energy, which includes: a rotatable top portion adapted to receive the external actuation force applied by the vehicle traveling on the roadway; a plurality of linkage members operatively connected to one another in succession, the rotatable top portion being operatively coupled to a first one of the plurality of linkage members operatively connected to one another in succession; a first wheel operatively coupled to a last one of the plurality of linkage members operatively connected to one another in succession; a second wheel operatively coupled to the first wheel via a tangential coupling element; a rotatable shaft operatively coupled to the second wheel; at least one flywheel operatively coupled to the rotatable shaft; and at least one electrical generator operatively coupled to the rotatable shaft, the electrical generator adapted to convert a rotational movement of the rotatable shaft into electrical energy. In this embodiment, the second wheel is configured to rotate at a higher angular velocity than the first wheel.

In a preferred embodiment of this aspect of the present invention, when the external actuation force is applied by the vehicle travelling on the roadway, one of the plurality of linkage members undergoes substantially translational movement and another one of the plurality of linkage members undergoes oscillatory movement.

In another preferred embodiment, one of the plurality of linkage members is pivotally mounted about a fixed support member.

In accordance with a second aspect of the present invention, there is provided an electrical generator apparatus configured to convert an external actuation force applied by a vehicle traveling on a roadway into electrical energy, which includes: a rotatable top portion adapted to receive the external actuation force applied by the vehicle traveling on the roadway; a plurality of first linkage members, each first linkage member having a first end and a second end, the first end of each of the first linkage members being operatively coupled to a lower surface of the rotatable top portion; a plurality of second linkage members, each second linkage member having a first end and a second end, the first end of each second linkage member being operatively coupled to the second end of a respective one of the first linkage members; a plurality of third linkage members, each third linkage member having a first end and a second end, the first end of each third linkage member being operatively coupled to the second end of a respective one of the second linkage members; a plurality of rotatable shafts, each rotatable shaft being operatively coupled to the second end of a respective one of the third linkage members; a plurality of flywheels, at least one of the plurality of flywheels being operatively coupled to a respective one of the plurality of rotatable shafts; and a plurality of electrical generators, at least one of the plurality of electrical generators being operatively coupled to a respective one of the rotatable shafts, the electrical generators adapted to convert a rotational movement of each of the rotatable shafts into electrical energy.

In a preferred embodiment of this aspect of the present invention, the rotatable top portion comprises a first end region and a second end region, the first end region of the rotatable top portion being rotatably connected to a support, and the second end region of the rotatable top portion being operatively coupled to the first ends of each of the first linkage members via respective downwardly protruding portions.

In another preferred embodiment, the electrical generator apparatus further includes: a plurality of first wheels, each first wheel being operatively connected to the second end of a respective one of the plurality of third linkage members; and a plurality of second wheels, each second wheel being operatively coupled to a respective one of the plurality of first wheels via a respective tangential coupling element, each of the plurality of second wheels being operatively connected to a respective one of the rotatable shafts.

In yet another preferred embodiment, an additional flywheel is operatively coupled to a respective one of each of the rotatable shafts.

In still another preferred embodiment, an additional electric generator is operatively coupled to a respective one of each of the rotatable shafts.

In yet another preferred embodiment, the rotatable top portion further includes: an upper layer of fiber reinforced polymer (FRP); and a lower support structure disposed underneath the upper layer of fiber reinforced polymer (FRP).

In still another preferred embodiment, the electrical generator apparatus further includes a housing having a plurality of sides for at least partially enclosing the plurality of first linkage members, the plurality of second linkage members, the plurality of third linkage members, the plurality of rotatable shafts, the plurality of flywheels, and the plurality of electrical generators.

In yet another preferred embodiment, the electrical generator apparatus further includes at least one elastic member operatively coupled to the rotatable top portion for urging the rotatable top portion in an upwardly direction after the external actuation force is applied thereto, the at least one elastic member exerting a resisting force when its shape is changed. In still another preferred embodiment, the elastic member comprises a tube spring.

In accordance with a third aspect of the present invention, there is provided an electrical generator system comprising two electrical generator apparatuses, each including the elements as described above for the second aspect of the invention, arranged in mirrored relationship to one another.

In a preferred embodiment of this aspect of the present invention, the two electrical generator apparatuses are mirrored with respect to a reference plane that extends in a direction transverse to the longitudinal direction of the roadway.

In accordance with a fourth aspect of the present invention, there is provided an electrical generating system that includes: a roadway portion having an upper surface; at least one vehicle travelling on the roadway portion, the at least one vehicle exerting a force on the upper surface of the roadway; a rotatable top portion provided in the roadway portion and adapted to receive the force applied by the vehicle traveling on the roadway portion; a first linkage member having a first end and a second end, the first end of the first linkage member being operatively coupled to the rotatable top portion; a second linkage member having a first end and a second end, the first end of the second linkage member being operatively coupled to the second end of the first linkage member; a third linkage member having a first end and a second end, the first end of the third linkage member being operatively coupled to the second end of the second linkage member; a rotatable shaft being operatively coupled to the second end of the third linkage member; at least one flywheel being operatively coupled to the rotatable shaft; and at least one electrical generator operatively coupled to the rotatable shaft, the electrical generator adapted to convert a rotational movement of the rotatable shaft into electrical energy.

In a preferred embodiment of this aspect of the present invention, the electrical generating system further includes: a first wheel operatively connected to the second end of the third linkage member; and a second wheel operatively coupled to the first wheel via a tangential coupling element, the second wheel being operatively connected to the rotatable shaft. In another preferred embodiment, the tangential coupling element comprises one of a chain or a belt. In yet another preferred embodiment, the second wheel is configured to rotate at a higher angular velocity than the first wheel.

In still another preferred embodiment, the at least one flywheel comprises two or more flywheels.

In yet another preferred embodiment, the second linkage member is pivotally mounted about a fixed support member.

The electricity generated by the present invention can be used for powering devices, such as roadway lights, that would otherwise consume electrical power supplied by a conventional power grid. Thus, the demand load of the conventional power grid is reduced, which in turn, reduces energy resources that are consumed by the conventional power plant that supplies electricity to the conventional power grid. Accordingly, the electrical generator apparatus of the present invention materially contributes to the efficient utilization and conservation of energy resources by making more efficient use of the fuel that is consumed by vehicles, and by reducing the demand load of conventional power plants. By harnessing the kinetic energy of moving vehicles, the present invention advantageously provides a valuable, additional source of electrical power that would otherwise be unutilized.

In addition, the electrical generator apparatus as claimed in the present application is an alternative, sustainable means of energy production. Unlike a conventional power plant, the electrical generator apparatus of the present invention is a "clean" technology that does not emit harmful waste products into the atmosphere as a byproduct of the power generation process. Consequently, the present invention also contributes to a reduction in greenhouse gas emissions by reducing harmful waste products that would otherwise by emitted from conventional power plants, which predominantly burn fossil fuels to generate electricity.

It is to be understood that the foregoing objects and summary, and the following detailed description of the present invention, are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 2 is a sectional side view of the electrical generator apparatus according to a second embodiment of the invention, which is denoted by cutting-plane line W-W in FIG. 6;

FIG. 3 is an enlarged view of the ramp plate center hinge of the electrical generator apparatus according to the second embodiment of the invention;

Throughout the figures, the same parts are always denoted using the same reference characters so that, as a general rule, they will only be described once.

DETAILED DESCRIPTION OF THE INVENTION

1. First Embodiment

Figure 1:
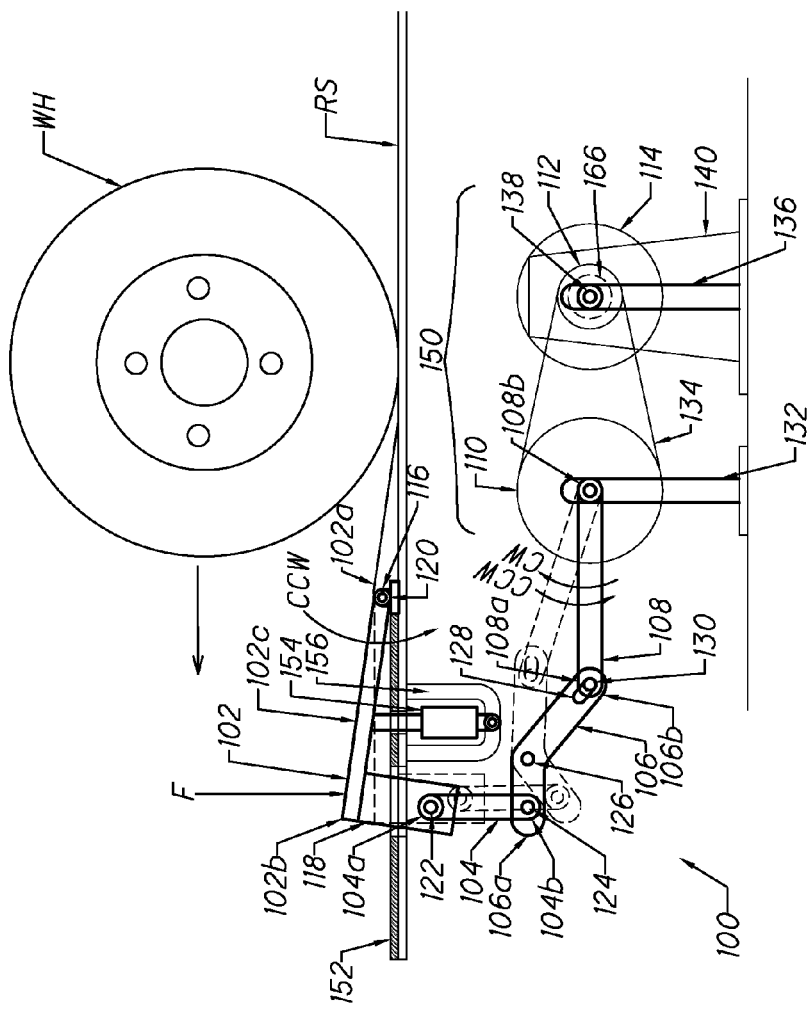
FIG. 1 is a side view of the electrical generator apparatus according to a first embodiment of the invention.

A first embodiment of an inventive electrical generator apparatus is seen generally at 100 in FIG. 1. In this embodiment, the electrical generator apparatus 100 generally comprises a rotatable top portion exemplified by rotatable lever portion 102, a first linkage member exemplified by plunger bar 104, a second linkage member exemplified by leverage bar 106, a third linkage member exemplified by crank 108, a first wheel 110, a second wheel 112, a flywheel 114, and an electrical generator 140. These components 102-140 are operatively coupled to one another such that electrical energy can be generated when an external actuation force F is applied to the rotatable lever portion 102 by a wheel WH of a vehicle traveling on a roadway surface RS. Each component of the system will be described in detail below.

In the first preferred embodiment of the invention, the rotatable lever portion 102 has a first end 102*a*, a second end 102*b*, and an upper surface 102*c*. At the first end 102*a*, the rotatable lever portion 102 is preferably rotatably connected to a support 116 located on the roadway surface RS via a pin 120. Conversely, at the second end 102b, the rotatable lever portion 102 is preferably fixedly attached to an upper edge of a plunger block 118. The lower portion of the plunger block 118 is rotatably coupled to a first end 104a of the plunger bar 104 via a pin 122. Thus, when an external actuation force F is applied to the upper surface 102c of the rotatable lever portion 102, the rotatable lever portion 102 rotates in a counter-clockwise direction CCW about a rotational axis disposed generally centrally through the pin 120. As a result of this motion, the second end 102b of the rotatable lever portion 102 and the plunger block 118 fixedly attached thereto undergoes a downward vertical displacement.

In the preferred embodiment depicted in FIG. 1, the rotatable lever portion 102 and the plunger block 118 are depicted as having generally rectangular geometries. However, it is to be understood that the rotatable lever portion 102 and the plunger block 118 could be formed using other geometric shapes without departing from the spirit of the invention, such as but not limited to, semi-circular shapes.

As seen in FIG. 1, the rotatable lever portion 102 is operatively connected to an upper end of a tube spring 154. The tube spring 154 extends vertically downward from the rotatable lever portion 102 to a lowermost end, which is pivotally mounted to a bottom member of a U-shaped tube spring support structure 156. The opposed, upper ends of U-shaped tube spring support structure 156 are attached to the bottom surface of a housing plate lying beneath the roadway surface RS. When the actuation force F is applied to the rotatable lever portion 102, the tube spring 154 is compressed and thus, undergoes elastic deformation. After the force F is no longer being applied to the rotatable lever portion 102 (i.e., when wheel WH is no longer pressing down on rotatable lever portion 102), the tube spring 154 urges the rotatable lever portion 102 back into its upward position. In order to prevent the rotatable lever portion 102 from loudly slamming against the top surface of the housing plate, a rubber pad 152 is disposed on the top surface thereof. Thus, when the bottom surface of the rotatable lever portion 102 contacts the top surface of the housing plate, an objectionable slamming noise can be avoided. In a preferred embodiment, the rubber pad 152 has a thickness of one-half (½) of an inch. However, one of ordinary skill in the art will readily appreciate that the rubber pad 152 can be formed using other thicknesses without departing from the spirit and scope of the invention.

The plunger bar 104, as depicted in the first embodiment, includes a first end 104a and a second end 104b. As described above, the first end 104a of the plunger bar 104 is preferably rotatably connected to a lower portion of the plunger block 118 via a pin 122. Conversely, the second end 104b of the plunger bar 104 is preferably rotatably connected to a first end 106a of the leverage bar 106 via a pin 124. When the plunger block 118 undergoes the abovedescribed vertical displacement, the plunger bar 104, which is pivotally attached to the plunger block 118, also undergoes a downward vertical displacement (as depicted by the dashed lines in FIG. 1). As it is vertically displaced, because the plunger bar 104 is not constrained about a stationary pivot of any type, it also undergoes a small horizontal displacement within a vertical reference plane oriented in the direction of traffic flow.

While the plunger bar 104 is depicted in FIG. 1 as having an elongated longitudinal geometry with rounded first and second ends 104a, 104b, those of ordinary skill in the art will readily understand that the plunger bar 104 can be formed using many different alternative geometries. For example, the ends 104a, 104b of the plunger bar 104 need not be rounded, rather the ends 104a, 104b could be formed using sharp corners (e.g., corners that form substantially 90-degree angles).

As seen in the first embodiment of FIG. 1, the leverage bar 106 includes a first end 106a and a second end 106b. As described above, the first end 106a of the leverage bar 106 is preferably rotatably connected to a second end 104b of the plunger bar 104 by virtue of pin 124. The second, opposite end 106b of the leverage bar 106 is operatively connected to a first end 108a of the crank 108 via a pin 130. When the plunger bar 104 is vertically displaced in the manner described above, the leverage bar 106 rotates in a counter-clockwise direction about a pin 126, which serves as a fixed pivot point for the leverage bar 106. As the leverage bar 106 rotates in the counter-clockwise direction, it rotates relative to crank 108, and pin 130 slides within an elongated slot 128 at the second end 106b of leverage bar 106. In the preferred embodiment, the ratio of the distance between the central axis of the pin 126 and pin 130 to the distance between the central axis of the pin 124 and pin 126 is between 2:1 and 4:1. However, one of ordinary skill in the art will readily appreciate that these ratios are merely exemplary, and that other ratios may be used without departing from the spirit of the invention.

While the leverage bar 106 is depicted in FIG. 1 as having a geometry that resembles that of a boomerang, those of ordinary skill in the art will readily understand that the leverage bar 106 can be formed using many different alternative geometries. For example, rather than employing an elongated geometry, the leverage bar 106 could be formed from a circular disk, or in the shape of an ellipse.

The crank 108 comprises a first end 108a and a second end 108b. As explained above, the first end 108a of the crank 108 is operatively connected to the second end 106b of the leverage bar 106. Conversely, the second end 108b of the crank 108 is fixedly attached to the central portion of the first wheel 110 such that crank 108 rotates together with the first wheel 110. In the preferred embodiment, the crank 108 is shown having a length that is substantially greater than the diameter of the first wheel 110. However, it is to be understood that this depicted length is merely given by way of example, and in no way is intended to be limiting. In other embodiments, the crank 108 has a length that is significantly less than the one shown in FIG. 1.

Advantageously, the first, second, and third linkage members 104, 106, 108 (plunger bar, leverage bar, and crank) are operatively coupled to one other without the use of any gears, cams, or clutches. Similarly, the rotatable lever portion 102 is operatively coupled to the first linkage member 104 without the use of any gears, cams, or clutches. Also, the electrical generator apparatus 100 of the present invention does not use any complex fluid or hydraulic systems of any type. Moreover, no magnetic or piezoelectric devices are employed in the electrical generator apparatus 100 of the present invention. Thus, the manufacturing and maintenance of the electrical generator apparatus 100 is simplified, and it is less susceptible to fatigue failure as compared to other systems that employ gears and cams.

Next, the electrical power generation sub-assembly 150 of FIG. 1 will be described in detail. The electrical power generation sub-assembly 150 generally comprises a first wheel 110, a second wheel 112, a tangential coupling element 134 coupling the first wheel 110 to the second wheel 112, a flywheel 114 operatively coupled to the second wheel 112 via an output shaft 138, and an electrical generator 140 operatively coupled to the second wheel 112 and the flywheel 114 via the output shaft 138. The tangential coupling element 134 may take the form of a belt, a chain, or any other coupling device that is capable transferring the rotational motion of the first wheel 110 to the second wheel 112 with minimal slippage. The first wheel 110 and the second wheel 112 are preferably structurally supported on a first support structure 132 and a second support structure 136, respectively.

Figure 12:
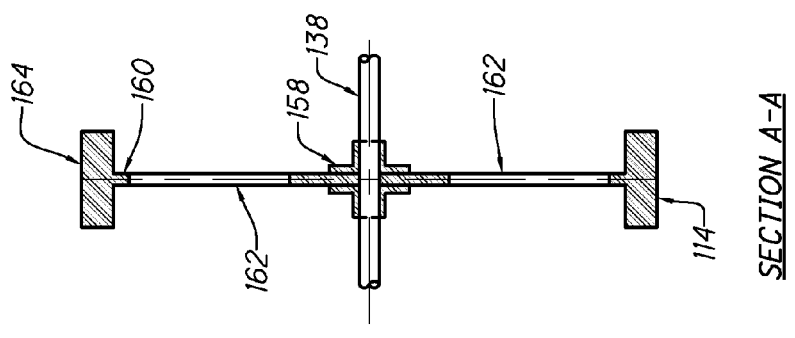
FIG. 12 is a sectional view of the flywheel of the electrical generator apparatus used in conjunction with the first and second embodiments of the invention, which is denoted by cutting-plane line A-A in FIG. 11.
Figure 11:
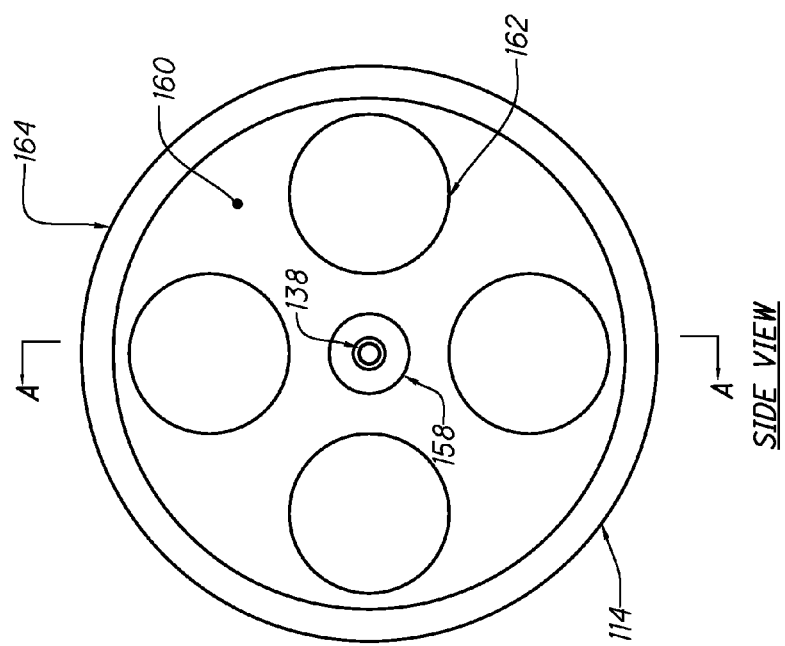
FIG. 11 is a side view of the flywheel of the electrical generator apparatus used in conjunction with the first and second embodiments of the invention.

A detailed depiction of an exemplary flywheel 114 is shown in FIGS. 11 and 12. At its approximate geometric center, the flywheel 114 has a hub 158, which operatively connects the flywheel 114 to the output shaft 138. The flywheel 114 has a body portion 160 located radially outward from the hub 158. The body portion 160 is provided with a plurality of apertures 162 provided therethrough in order to minimize the weight of the body portion 160, as well as to reduce the amount of material that is required to form the body portion 160, which desirably reduces its manufacturing cost. In other embodiments, the flywheel 114 could be provided with a plurality of spokes or arms in lieu of the body portion 160. At its outer periphery, the flywheel 114 contains a rim portion 164. As best seen in the sectional view of FIG. 12, the rim portion 164 has a thickness in the axial direction that is substantially greater than that of the body portion 160. This is the preferred design for the flywheel 114 because it concentrates the bulk of the flywheel mass in the portion of the flywheel 114 that has the largest radii. The mass at the largest radius of the flywheel 114 contributes much more to its mass moment of inertia because the mass moment of inertia is proportional to: $mr^2$ (mass multiplied by the square of the radius). Thus, concentrating the majority of the flywheel mass in the portion of the flywheel having the largest radii, results in a more efficient use of the material(s) that are used to form the flywheel 114.

An exemplary electrical generator 140 is a conventional direct current (DC) generator having a mechanical input shaft, electrical output wires, and a plurality of internal components encased within a metal housing. The main internal components of the electrical generator 140 include, but are not limited to, the following: a magnetic frame or yoke, pole coils or field coils, armature windings or conductors, brushes and bearings, pole cores and pole shoes, an armature core, and a commutator. Because the structure and functionality of conventional DC generators are well known in the electromechanical arts, an extensive discussion of electrical generator 140 is not necessary in the present disclosure.

As shown in FIG. 1, the electrical power generation sub-assembly 150 further includes a freewheel or overrunning clutch 166 that disengages the output shaft 138 from the second wheel 112 when the output shaft 138 rotates faster than the second wheel 112 so that the output shaft 138 is able to freely and continually rotate independent from the second wheel 112. Rather than employing a freewheel 166, the electrical power generation sub-assembly 150 could alternatively utilize a freehub for enabling the independent rotation of the output shaft 138. Because the operation of freewheels, overrunning clutches, and freehubs are well known in the mechanical arts, a detailed discussion of their operation is not necessary in the disclosure at hand.

Now, the operation of the electrical generator apparatus 100 will be explained. As the wheels WH of vehicles traveling on the roadway surface RS pass over the rotatable lever portion 102, they will exert a generally downward actuation force F on the upper surface 102c thereof. In response to the application of this force F, the rotatable lever portion 102 will rotate in a counter-clockwise direction that will, in turn, displace the plunger block 118 that is attached to the second end 102b of the rotatable lever portion 102 in a generally downward direction (see dashed lines in FIG. 1). The downward movement of the plunger block 118 will cause the plunger bar 104 to be displaced in a similar downward fashion (as depicted by the dashed lines). In response to the displacement of the plunger bar 104, the leverage bar 106 will rotate in a counter-clockwise direction about fixed pivot (pin 126). Thus, the first end 106a of the leverage bar 106 will be downwardly displaced, while its second end 106b containing elongated slot 128 will be upwardly displaced (see dashed lines in FIG. 1). Because the crank 108 is operatively coupled to the leverage bar 106, the upward displacement of the second end 106b of the leverage bar 106 will result in a consequential upward displacement of the first end 108a of the crank 108 and a clockwise rotation of the crank 108 (refer to dashed lines in FIG. 1). The first wheel 110, which is fixedly secured to the crank 108, will also rotate in a clockwise direction together with tangential coupling element 134, which is attached to the periphery thereof. The clockwise rotational movement of the tangential coupling element 134 will, in turn, drive the second wheel 112 in a clockwise direction. Because the second wheel 112 has a diameter that is significantly smaller than the diameter of the first wheel 110, the second wheel 112 will rotate at a substantially higher angular velocity, and revolutions per minute (RPM), as compared to the first wheel 110. This will help maximize the power generated by this system. As described above, the second wheel 112 is operatively coupled to a flywheel 114 and an electrical generator 140 via the output shaft 138. Thus, the rotation of the second wheel 112 will be transmitted to both the flywheel 114 and the electrical generator 140. The flywheel 114, which has a substantial moment of inertia, is used as a storage device for storing rotational energy. In particular, the flywheel 114 helps to maintain the continual rotation of the output shaft 138 during the periods when vehicles are not applying the external actuation force F on the upper surface 102c of the rotatable lever portion 102. Thus, the generator is able to deliver electrical power on a more consistent basis during the operation of the system.

In the paragraph above, the downward stroke of the electrical generator apparatus 100 was described in detail. However, it is to be understood that the electrical generator apparatus 100 undergoes cyclical motion and thus, when components 102, 104, and 118 reach the lowermost limit of the downward stroke (as indicated by the dashed lines in FIG. 1), components 102, 104, 106, 108, and 118 begin to move in the opposite direction, and the upward stroke of the electrical generator apparatus 100 commences. In a preferred embodiment, the tube spring 154, which is compressed when the actuation force F is applied to the rotatable lever portion 102, is used to urge the components 102, 104, and 118 in an upward direction during the upward stroke of the electrical generator apparatus 100. However, one of ordinary skill in the art will readily understand that other devices may be utilized in lieu of a tube spring such as, for example, a coil spring mounted around the outer periphery of pin 120. When installed on a roadway surface RS, the upward stroke of the electrical generator apparatus 100 occurs when the actuation force F is not being applied to the upper surface 102c of the rotatable lever portion 102 (i.e., when the tire(s) of the vehicle are not contacting the upper surface 102c of the rotatable lever portion 102).

2. Second Embodiment

A second embodiment of an inventive electrical generator apparatus is seen generally at 200 in FIGS. 2 and 4-6. In some respects, the second embodiment is similar to that of the first embodiment. Moreover, some parts are common to both such embodiments. For the sake of brevity, the parts that the second embodiment of the electrical generator apparatus 200 has in common with the first embodiment of the electrical generator apparatus 100 will not be described in conjunction with the second embodiment because these components have already been explained in detail above. Furthermore, in the interest of clarity, these components will be denoted using the same reference characters that were used in the first embodiment.

However, it is evident from FIGS. 2 and 4-6 that the second embodiment of the electrical generator apparatus 200 also differs in several important respects from that of the first embodiment of FIG. 1. The unique features of the second embodiment will be explained in detail below. One of ordinary skill in the art will readily appreciate that the constituent parts of the first and second embodiments may be readily combined with one another without departing from the spirit and the scope of this invention.

First, turning to FIG. 2, one can see that the upper end of each plunger block 118 is operatively coupled to a corresponding ramp plate that includes a fiber reinforced polymer (FRP) panel section 202, rather than the rotatable lever portion 102 depicted in FIG. 1. The FRP panel section 202 is particularly well-suited for use on a roadway because it has a high strength-to-weight ratio, and it is corrosion resistant, impact resistant, and easy to maintain. In addition, it is more cost effective than the other materials that are suitable for this application. As shown in FIG. 2, each FRP panel section 202 is structurally supported on a panel support structure 208, which is pivotally mounted about a ramp plate hinge 206. The ramp plate hinge 206 allows a portion of the FRP panel sections 202 to rotate in manner similar to that of the rotatable lever portion 102 described in conjunction with the first embodiment. FIG. 2 depicts two FRP panel sections 202 and corresponding panel support structures 208 inclined upwardly toward one another. The panel support structures 208 come together in a semi-interlocking fashion at a ramp plate center hinge 210.

A detailed view of the ramp plate center hinge 210 is illustrated in FIG. 3. As seen in this figure, when the ramp plates are in the raised position, the complementary edges 240 of the two inclined panel support structures 208 are provided with a slight clearance therebetween so that the panel support structures 208 do not interfere with the downward movement of the ramp plates when the vehicle wheels WH are passing thereover. In a preferred embodiment, the surfaces of the edges 240 are provided with a durable coating, such as Teflon®. While a particular geometry has been depicted for the edges 240 of the panel support structures 208, it is to be understood that the edges 240 can be formed using other geometric configurations so long as the geometry of the edges 240 does not impede with the downward movement of the ramp plates.

In a preferred embodiment, the ramp plates have a slope of approximately 10:1 horizontal-to-vertical or less in the raised position (solid line position) depicted in FIG. 2. When a vehicle passes over the ramp plates, they rotate downwardly and become substantially flat when the weight of the passing vehicle is applied thereto. Consequently, the vertical vibration experienced by the occupants of the passing vehicle is significantly less than that encountered when riding over a rigid ramp with the same profile design. Although a slope of approximately 10:1 or less is preferred to minimize vehicle vibrations, it is to be understood that other slopes may be used for the ramp plates without departing from the spirit and the scope of the invention.

In one embodiment, the panel support structure 208 is in the form of a one (1) inch thick steel plate. However, one of ordinary skill in the art will readily appreciate that the panel support structure 208 can be formed in many different ways. For example, rather than using a steel plate that is one (1) inch thick, one could utilize a thinner steel plate and provide the thinner plate with stiffeners in order to increase its strength and rigidity.

As seen in FIG. 2, each panel support structure 208 is operatively connected to an upper end of a tube spring 154. The tube spring 154 extends vertically downward from the panel support structure 208 to a lowermost end, which is pivotally mounted to the bottom member of a U-shaped tube spring support structure 156. The opposed, upper ends of U-shaped tube spring support structure 156 are attached to the bottom surface of the top plate of housing 216. The functionality of the tube spring 154 is virtually the same as that described above for the first embodiment.

In a preferred embodiment, the outer portions of each FRP panel section 202 are structurally supported using high strength (6,000 psi) mortar 218 (see FIG. 2). This helps to ensure the structural integrity of the electrical generator apparatus 200 when large vehicles are passing over the apparatus 200. This is especially important when large, extremely heavy tractor trailers are passing over the electrical generator apparatus 200 on a highway installation.

Figure 6:
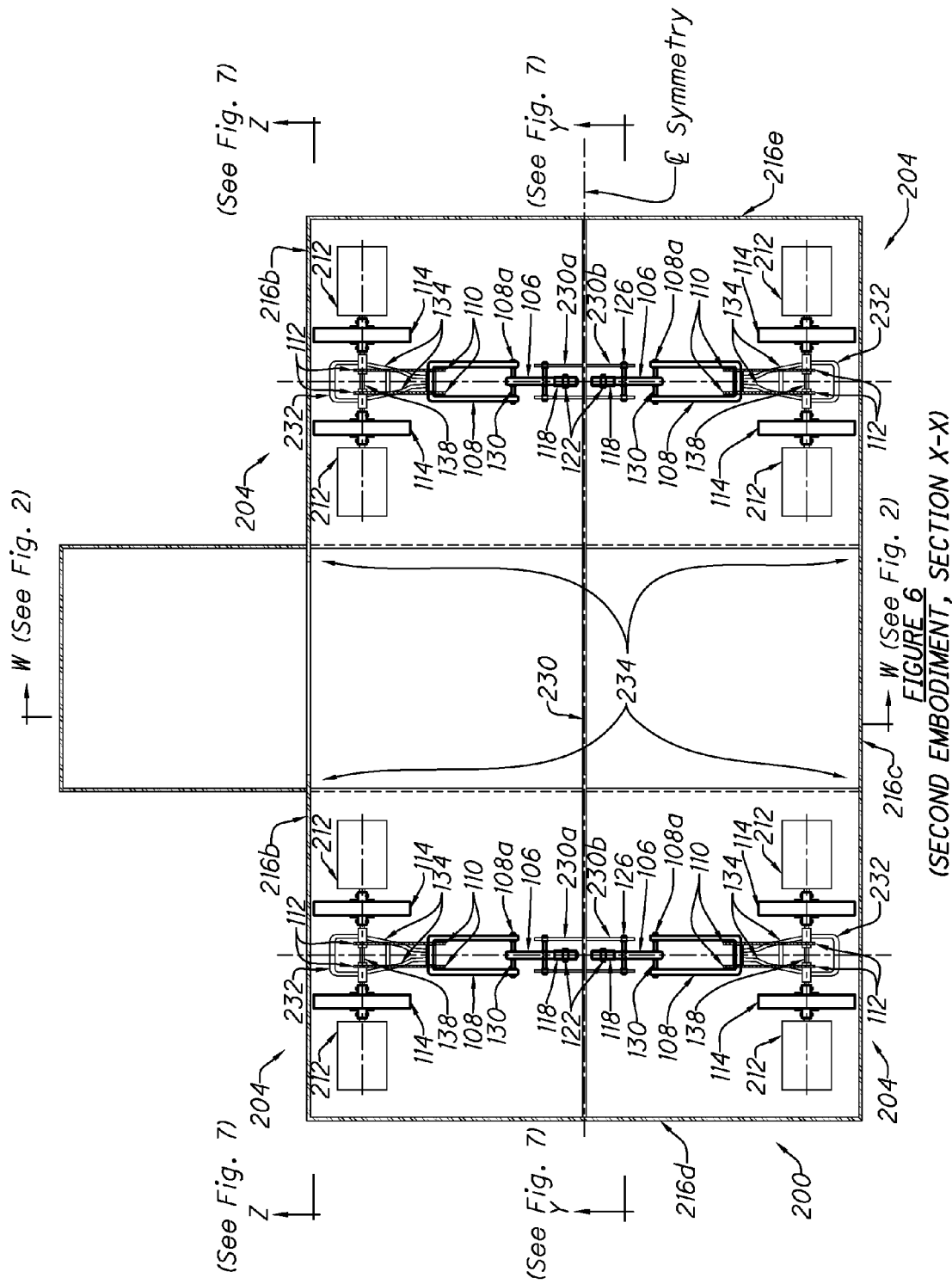
FIG. 6 is yet another top view of the electrical generator apparatus according to the second embodiment of the invention, but with the top plate of the housing removed, which is denoted by cutting-plane line X-X in FIG. 2.
Figure 7:
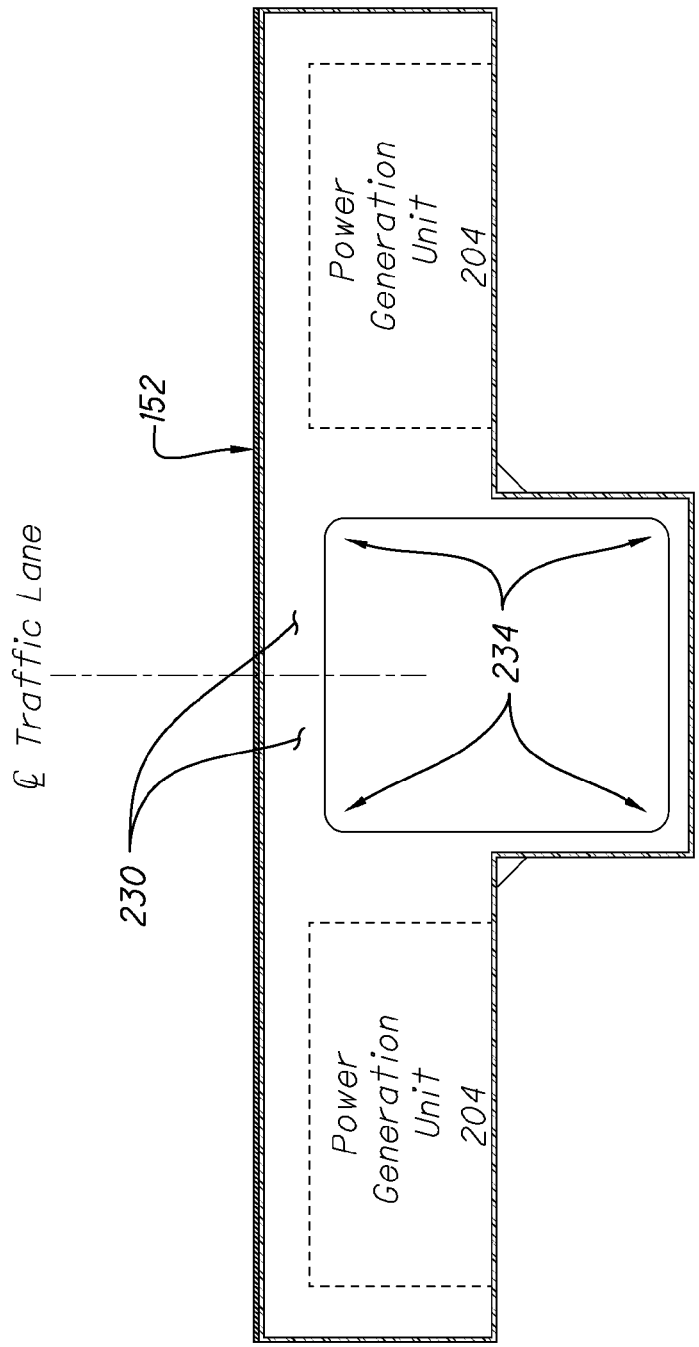
FIG. 7 is a sectional side view of the electrical generator apparatus according to the second embodiment of the invention, which is denoted by cutting-plane lines Y-Y and Z-Z in FIG. 6, depicting the maintenance access passageway.

As can be seen in FIGS. 2 and 6, the second embodiment of the electrical generator apparatus 200 comprises a first plurality of electrical generator sub-assemblies 204 arranged in mirrored relationship to a second plurality of electrical generator sub-assemblies 204. This arrangement of electrical generator sub-assemblies 204 enables the power output generated therefrom to be maximized. As best shown in FIG. 6, the generators 212 of the first plurality of electrical generator sub-assemblies 204 are substantially aligned in the horizontal (left-to-right) direction along centerlines. Similarly, the generators 212 of the second plurality of electrical generator sub-assemblies 204 are substantially aligned in the horizontal (left-to-right) direction along centerlines, which are spaced apart from, and generally parallel to, the centerlines of the first plurality of electrical generator sub-assemblies 204. Moreover, it can be seen that each electrical generator sub-assembly 204 contains two generators 212 mounted on output shaft 138 in an opposed relationship to one another. On the inner side of each of these two generators 212, and secured to output shaft 138, are mounted two flywheels 114 for energy storage purposes (as described above). While the arrangement of FIG. 6 depicts the generators 212 of each respective first and second plurality of electrical generator sub-assemblies 204 being substantially aligned with one another, one of ordinary skill in the art will readily appreciate that other configurations are possible. For example, the electrical generators 212 of each sub-assembly 204 could be arranged in a staggered relationship with respect to one another in the longitudinal direction (i.e., in the left-to-right direction of FIG. 6).

Figure 4:
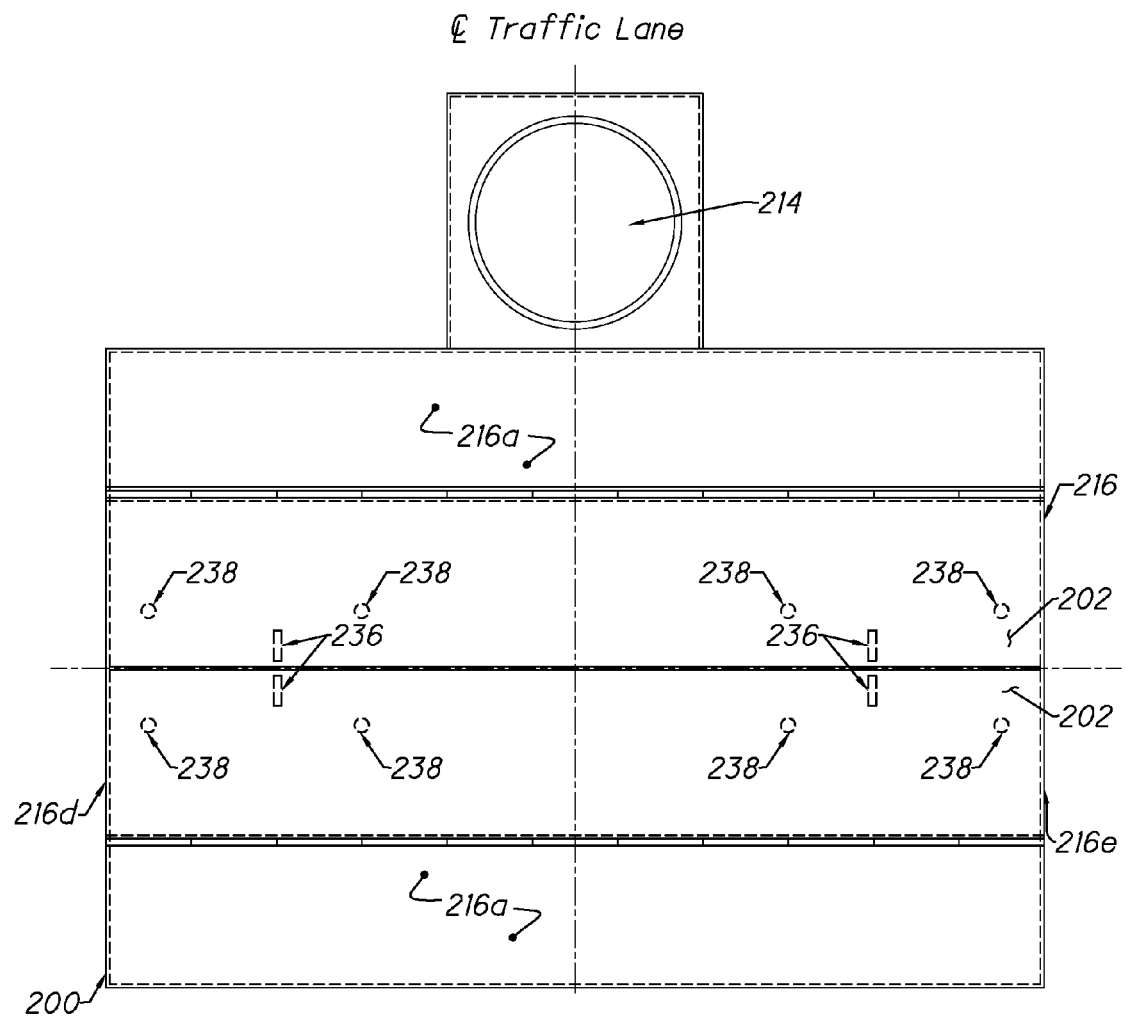
FIG. 4 is a top view of the electrical generator apparatus according to the second embodiment of the invention with the ramp plates shown on the top of the housing.
Figure 5:
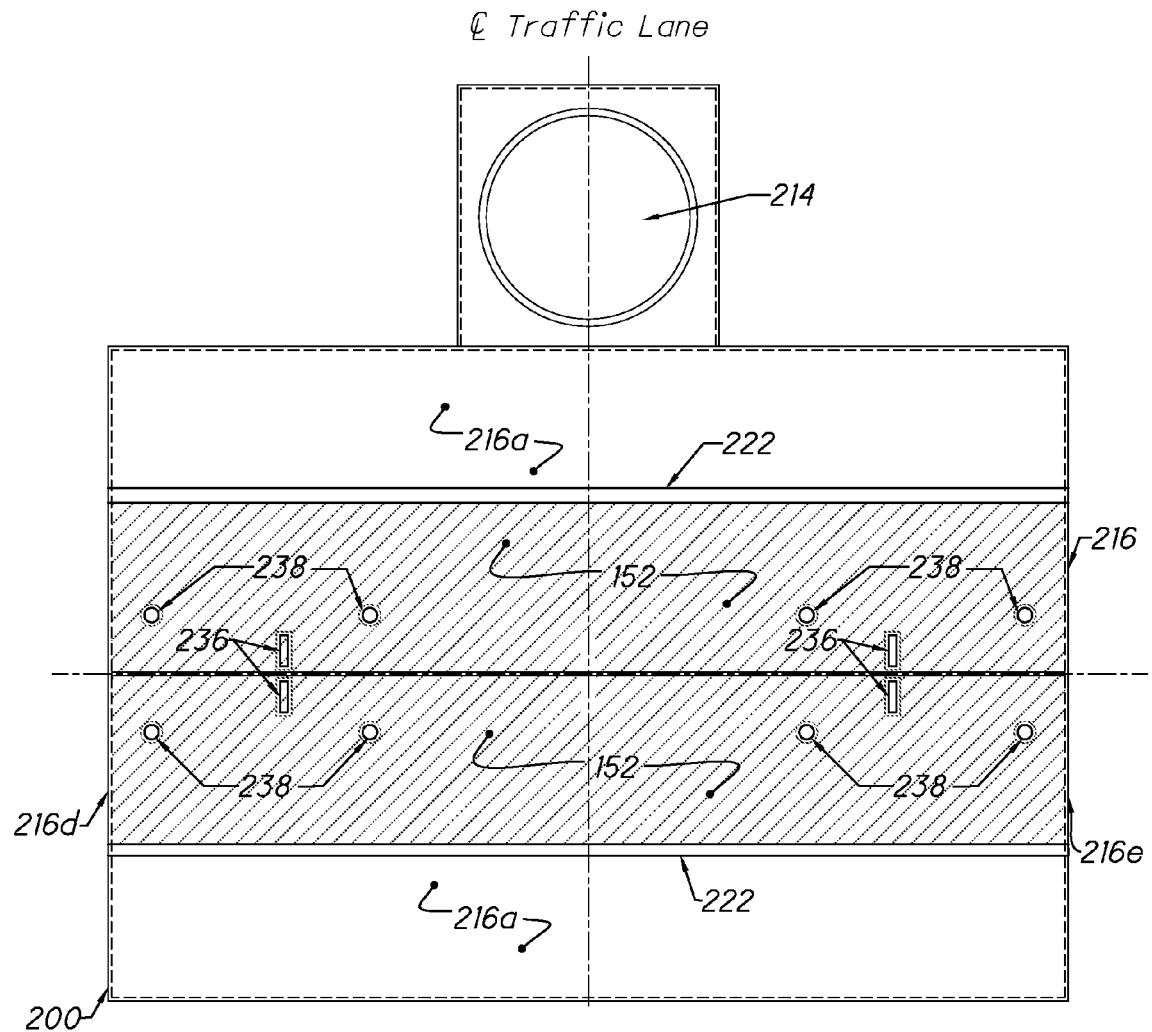
FIG. 5 is another top view of the electrical generator apparatus according to the second embodiment of the invention with the ramp plates removed from the housing.

Now, with reference to FIGS. 2, 4, 5, and 6, the structure of housing 216 will be described. As shown in these figures, the first and second pluralities of electrical generator sub-assemblies 204 are enclosed within a housing 216. The housing 216 generally comprises a top plate 216a, side plates 216b, 216c, end plates 216d, 216e, and a bottom plate 216f. The top plate 216a of the housing 216 is best shown in FIGS. 4 and 5, which respectively depict the top of the housing 216 with the ramp plates shown, and the ramp plates removed. As seen in these two figures, the top plate 216a contains two sets of apertures for accommodating the passage of components therethrough. The apertures are shown dashed in FIG. 4 because they are located underneath the ramp plates, while they are shown solid in FIG. 5 because the ramp plates have been omitted in this figure. The first set of apertures comprises four (4) elongated slots 236, each designed for accommodating one of the plunger blocks 118. The elongated slots 236 are all sized to be slightly larger than the cross-sectional area of each plunger block 118 so that each plunger block is able to freely move in a substantially vertical direction without interfering with the top plate 216a of the housing 216. The second set of apertures comprises eight (8) circular openings 238, each designed for accommodating one of the tube spring 154 shafts. Similar to the elongated slots 236, the circular openings 238 are all sized to be slightly larger than the cross-sectional area of the component that they receive. In this case, each circular opening 238 is sized to be slightly larger than the shaft of each tube spring 154. Thus, the shaft of each tube spring 154 is able to freely move in a substantially vertical direction without coming into contact with the top plate 216a of the housing 216.

As best seen in FIG. 5, similar to the first embodiment of the invention, a rubber pad 152 is disposed on the top surface of the top housing plate 216a between the bases 222 of each ramp plate hinge 206 so as to prevent the rotatable ramp plates from loudly slamming against the top surface of the housing plate 216a. Thus, when the bottom surface of the panel support structure 208 comes into contact with the top surface of the housing plate 216a, an objectionable slamming noise can be avoided. In a preferred embodiment, the rubber pad 152 has a thickness of one-half (½) of an inch, but those of ordinary skill in the art will appreciate that other thicknesses may also be used without departing from the spirit of the invention.

Also, in a preferred embodiment, the top and bottom corners of the housing 216 are provided with corner stiffeners 220 (see FIG. 2). Solely for the purpose of illustration, and not of limitation, the housing 216 can be formed from one-half (½) inch thick steel plates, while the corner stiffeners 220 can be 1"×3"×3" corner stiffeners. However, one of ordinary skill in the art will readily appreciate that the housing 216 can be formed using plates with other thicknesses and from other materials and that similarly, other sizes of corner stiffeners 220 can be used without departing from the spirit and scope of the invention.

While not explicitly shown in the drawings, the housing 216 of the electrical generator apparatus 200 can be flanked on opposite sides by electrical wiring conduits. After leaving the electrical generator apparatus 200, the wiring from the generators 212 can be routed in the electrical wiring conduits to an electrical storage device (e.g., a battery array) and/or devices that require electrical power (e.g., street lights). In a preferred embodiment, the electrical wiring conduits are mounted in class "S" type concrete. Class "S" type concrete is highly desirable for use in such an application because it is very strong, and has a compressive strength (f' c) of 4,500 psi.

In FIG. 2, it is seen that the gap between the outer, upper edge of the housing 216 and the adjacent roadway pavement 228 is ideally filled with a joint sealer 224 so as to prevent the separation of the electrical generator apparatus 200 from the existing roadway pavement 228. In addition, the joint sealer 224 also provides a benefit from the standpoint of waterproofing, namely the joint sealer 224 inhibits or prevents the passage of moisture in the gap between the housing 216 and the existing roadway pavement 228 adjacent thereto. Even though not explicitly shown in the figures, one of ordinary skill in the art will readily appreciate that the other sides of the housing 216 can be provided with a joint sealer 224 completely therearound for the purposes herein described.

Referring again to FIG. 2, the output shaft 138 is seen to be operatively connected to the second wheel 112. Also, as described above with regard to the first embodiment, the second wheel 112 is operatively coupled to the first wheel 110 via a tangential coupling element 134. In the second embodiment, as depicted in FIG. 6, it can be seen that first wheel 110, second wheel 112, and output shaft 138 are mounted on a wheel support frame 232. It is to be understood that the geometry of the wheel support frame 232 depicted in FIG. 6 is merely exemplary in nature, and that many other geometric configurations of the wheel support frame 232 can be used without departing from the spirit of the invention described herein.

In FIG. 6, it can be seen that the crank 108, which is operatively connected to the first wheel 110, has a U-shaped geometry. While it is to be understood that this particular geometric configuration of the crank 108 is in no way limiting and that other geometric configurations are explicitly contemplated herein (e.g., the crank could merely be a simple longitudinally-extending bar), the beneficial aspects of this particular geometric configuration are worth noting. For example, as shown in FIG. 6, the U-shaped geometry of the crank 108 enables two first wheels 110 to be placed next to one another, each on an opposing side of the wheel support frame 232. This additional first wheel 110 would be advantageously coupled to an additional second wheel 112 via an additional tangential coupling element 134. This particular arrangement of the electrical generator sub-assembly 204 could have numerous benefits, such as reducing the fatigue stress on the tangential coupling element 134.

As described above with regard to the first embodiment, the crank 108 is operatively connected to the leverage bar 106 at its first end 108a. Similarly, the pivotal motion of the leverage bar 106 about fixed pivot pin 126 was heretofore described. However, the manner in which the pivot pin 126 is structurally supported was not described in conjunction with the first embodiment, so it will be described here. As best depicted in FIG. 2, a central support structure 230 is provided between the first and second pluralities of electrical generator sub-assemblies 204, which are provided in mirrored relationship to one another. In order to provide a mounting surface for each pivot pin 126, lateral sides of the center support structure 230 are provided with opposing mounting plates 230a, 230b. Each of these mounting plates 230a, 230b accommodates one pivot pin 126. In addition to providing a support structure for the pivot pins 126, the central support structure 230 also advantageously structurally supports the top plate 216a of the housing 216. After all, the top plate 216a supports a vast amount of weight, particular when vehicles are passing over the top of the electrical generator apparatus 200.

In a preferred embodiment, the overall width of the electrical generator apparatus 200 is approximately 11'-0" (i.e., in the longitudinal direction of the housing side plates 216b, 216c). This overall width of approximately 11'-0" is sized in accordance with the typical width for a lane of traffic. While the U.S. Highway System uses a 12-foot (3.7 m) standard lane width, lanes having a 11-foot (3.4 m) width are found to be acceptable by the Federal Highway Administration for automobile traffic. However, it is to be understood that this dimension is merely given by way of example, and in no way is intended to be limiting. Thus, it is readily appreciated that, in other embodiments, the electrical generator apparatus 200 can have a width different than 11'-0".

Now, maintenance access to the electrical generator apparatus 200 will be described with reference to FIGS. 2 and 4-7. In general, service access to the electrical generator apparatus 200 will be achieved using an access manhole 214 and associated passageway 234. In particular, as best shown in FIGS. 2, 4, and 5, the manhole 214 will be placed at a predetermined location in the existing roadway pavement 228 that surrounds the housing 216, preferably adjacent to the housing 216 (see e.g., FIG. 2). A first vertical portion of the passageway 234 is provided beneath the manhole 214. And, as best shown in FIG. 6, a second horizontal portion of the passageway 234 extends through side 216b of the housing 216, and between a plurality of electrical generator subassemblies 204. The passageway 234 allows a service technician to gain access to the components of the electrical generator apparatus 200, such as the generators 212. As most clearly illustrated in FIG. 7, the horizontal portion of the passageway 234 has a height that is significantly greater than the portions of the housing 216 in which the electrical generator subassemblies 204 (schematically represented in FIG. 7) are disposed. The additional height of the horizontal portion of the passageway 234 is intended to enable a service technician to crawl into the interior of the housing 216 so that the desired maintenance may be performed on the electrical generator subassemblies 204. It is to be understood that the sizes and locations of the access manhole 214 and the passageway 234 can be varied without departing from the spirit of the invention. For example, rather than passing through side 216b of the housing 216, the horizontal portion of the passageway 234 could alternatively extend through side plate 216c, one of the end plates 216d, 216e, or through the bottom plate 216f.

In a preferred embodiment, the access manhole 214 is of heavy-duty construction, and has a diameter of approximately two-feet and six inches (2'-6"). Although, it is to be understood that the manhole 214 can be formed using other diameters without departing from the spirit and scope of the invention.

Figure 8:
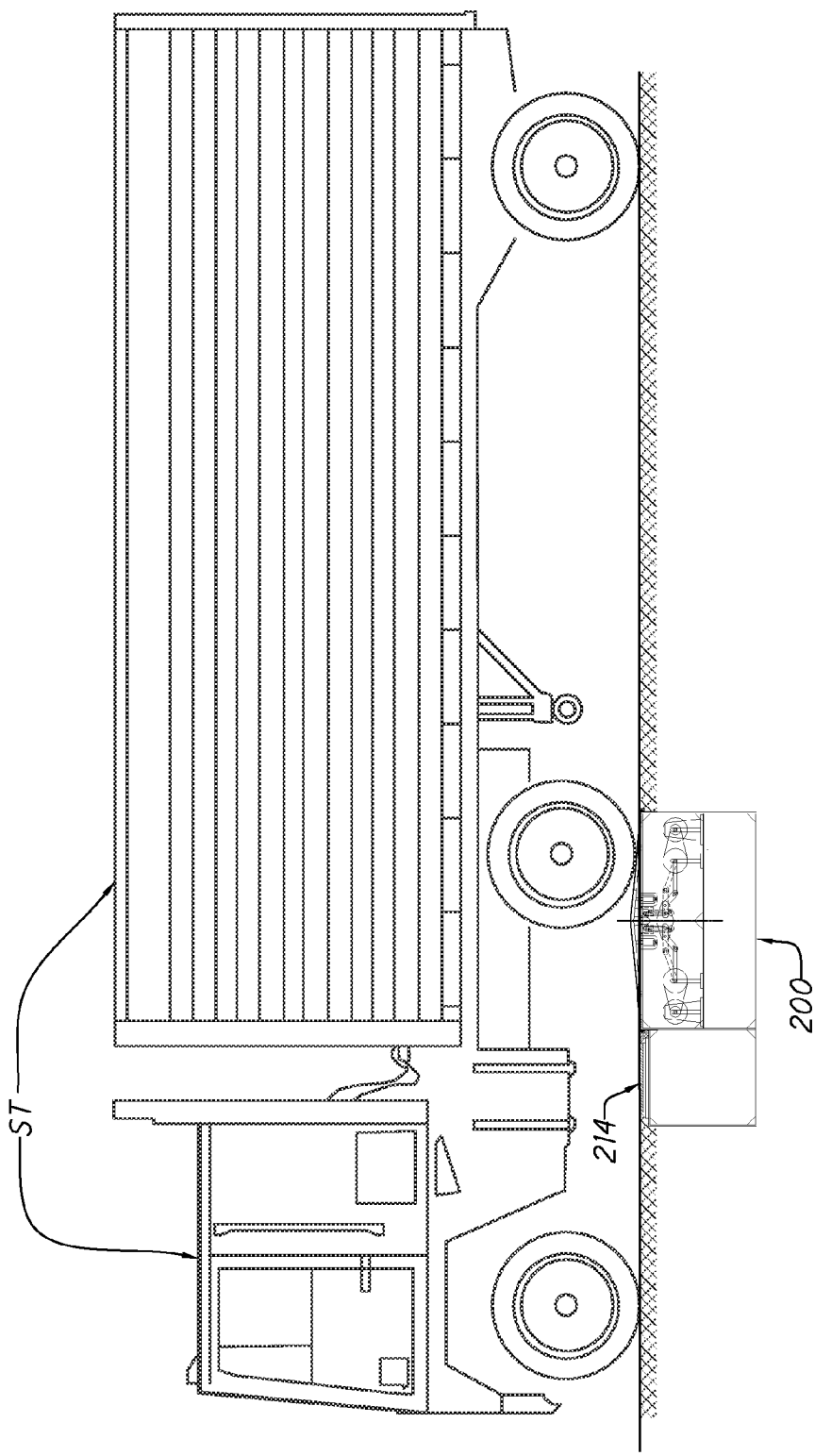
FIG. 8 is a sectional side view of the electrical generator apparatus according to the second embodiment of the invention installed on a roadway with a semi-truck depicted thereon.
Figure 9:
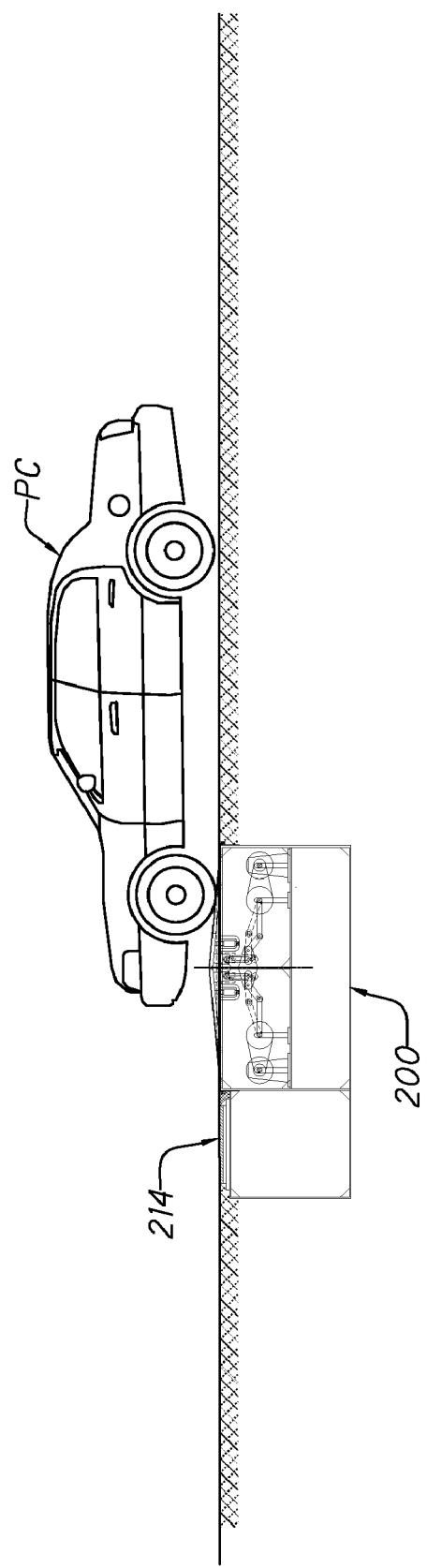
FIG. 9 is a sectional side view of the electrical generator apparatus according to the second embodiment of the invention installed on a roadway with a passenger car depicted thereon.

FIG. 8 depicts the electrical generator apparatus 200 and associated access manhole 214 on a roadway with a semi-truck ST shown thereon. Similarly, FIG. 9 depicts the electrical generator apparatus 200 and manhole 214 on a roadway with passenger car PC depicted thereon. The purpose of these two figures is simply to give an illustrative example of the relative size of the electrical generator apparatus 200 as compared to that of common vehicles, such as the semi-truck ST and the passenger car PC, travelling on a roadway. One of ordinary skill in the art will readily appreciate that the relative sizes of the electrical generator apparatus 200 illustrated in FIGS. 8 and 9 are merely exemplary in nature, and thus are in no way intended to limit the scope of the invention. It also will be readily apparent to one of ordinary skill in the art that the electrical generator apparatus 200 can be formed in many different sizes, and that all of these variations are included within the scope of the claimed invention.

Figure 10:
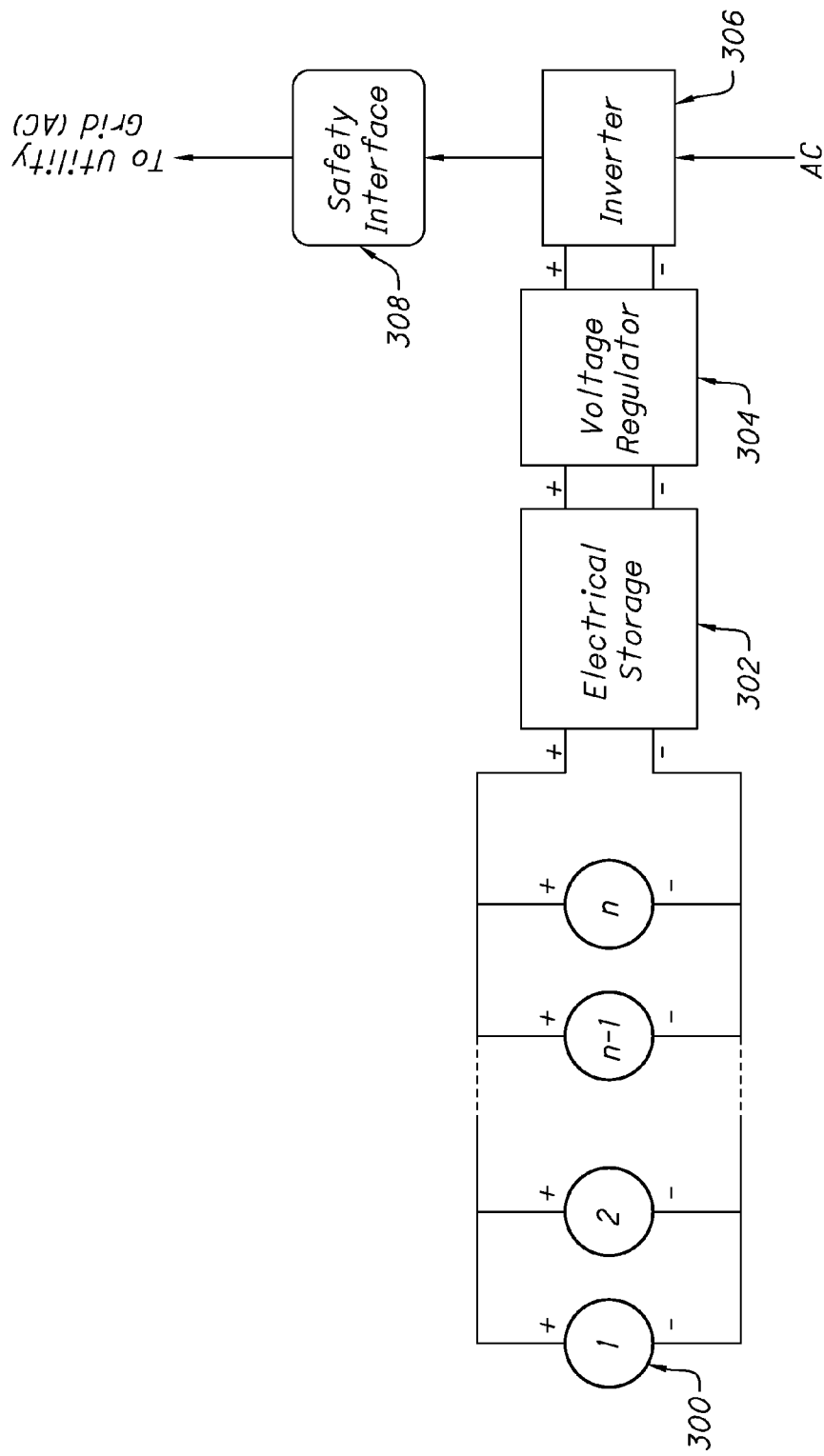
FIG. 10 is an electrical schematic diagram of the electricity collection system used in conjunction with the electrical generator apparatus.

In FIG. 10, an electrical schematic diagram of an exemplary electricity collection system used in conjunction with the first and second embodiments of electrical generator apparatus 100, 200 is depicted. One of ordinary skill in the art will readily appreciate that the electricity collection system illustrated in FIG. 10 is simply one example of an electrical collection system that can be utilized with the electrical generator apparatuses 100, 200, and therefore, the invention is in no way limited to this particular configuration. In FIG. 10, a plurality of generators 300 wired in parallel is electrically connected to an electrical storage device 302. The plurality of generators 300 produce direct current (DC) power. In a preferred embodiment, the electrical storage device 302 comprises one or more batteries for storing the electrical energy generated by one or more electrical generator apparatuses 100, 200. However, in other embodiments of the invention, a different type of electrical storage device could be employed, such as capacitors or ultracapacitors. A voltage regulator 304 for automatically maintaining a constant voltage level is electrically connected to the electrical storage device 302. On its output side, the voltage regulator 304 is electrically connected to an inverter 306 that converts the incoming direct current (DC) from the voltage regulator 304 into alternating current (AC) for power use. After passing through both the voltage regulator 304 and the inverter 306, the output power from the electrical generator apparatuses 100, 200 has the same voltage and frequency as the local power grid. Although, before being transmitted to the utility grid, the alternating current (AC) on the output side of the inverter 306 passes through a safety interface device 308.

While exemplary embodiments have been described herein, one of ordinary skill in the art will readily appreciate that the exemplary embodiments set forth above are merely illustrative and should not be construed as to limit the claims in any manner. Rather, the scope of the invention is defined only by the appended claims and their equivalents, and not, by the preceding description.

The invention claimed is:

1. An electrical generator system configured to convert an external actuation force applied by a vehicle traveling on a roadway into electrical energy, the electrical generator system comprising:
  a plurality of electrical generator apparatuses, a first of said plurality of electrical generator apparatuses being arranged in mirrored relationship to a second of said plurality of electrical generator apparatuses, the first and second electrical generator apparatuses being mirrored with respect to a reference plane that extends in a direction transverse to the longitudinal direction of the roadway, and the first and second electrical generator apparatuses each including:
    a rotatable top portion adapted to receive the external actuation force applied by the vehicle traveling on the roadway;
    a plurality of first linkage members, each first linkage member having a first end and a second end, the first end of each of the first linkage members being operatively coupled to a lower surface of the rotatable top portion;
    a plurality of second linkage members, each second linkage member having a first end and a second end, the first end of each second linkage member being operatively coupled to the second end of a respective one of the first linkage members;
    a plurality of third linkage members, each third linkage member having a first end and a second end, the first end of each third linkage member being operatively coupled to the second end of a respective one of the second linkage members;
    a plurality of rotatable shafts, each rotatable shaft being operatively coupled to the second end of a respective one of the third linkage members;
    a plurality of flywheels, at least one of the plurality of flywheels being operatively coupled to a respective one of the plurality of rotatable shafts; and
  a plurality of electrical generators, at least one of the plurality of electrical generators being operatively coupled to a respective one of the rotatable shafts, the electrical generators adapted to convert a rotational movement of each of the rotatable shafts into electrical energy.

2. The electrical generator system according to claim 1, wherein the rotatable top portion comprises a first end region and a second end region, the first end region of the rotatable top portion being rotatably connected to a support, and the second end region of the rotatable top portion being operatively coupled to the first ends of each of the first linkage members via respective downwardly protruding portions.

3. The electrical generator system to claim 1 the first and second electrical generator apparatuses each further comprising:
   a plurality of first wheels, each first wheel being operatively connected to the second end of a respective one of the plurality of third linkage members; and
   a plurality of second wheels, each second wheel being operatively coupled to a respective one of the plurality of first wheels via a respective tangential coupling element, each of the plurality of second wheels being operatively connected to a respective one of the rotatable shafts.

4. The electrical generator system according to claim 3, wherein an additional flywheel is operatively coupled to a respective one of each of the rotatable shafts.

5. The electrical generator system according to claim 4, wherein an additional electric generator is operatively coupled to a respective one of each of the rotatable shafts.

6. The electrical generator system according to claim 1, wherein the rotatable top portion further comprises:
   an upper layer of fiber reinforced polymer (FRP); and
   a lower support structure disposed underneath the upper layer of fiber reinforced polymer (FRP).

7. The electrical generator system according to claim 1 further comprising a housing having a plurality of sides for at least partially enclosing the plurality of first linkage members, the plurality of second linkage members, the plurality of third linkage members, the plurality of rotatable shafts, the plurality of flywheels, and the plurality of electrical generators.

8. The electrical generator system according to claim 1 further comprising at least one elastic member operatively coupled to the rotatable top portion for urging the rotatable top portion in an upwardly direction after the external actuation force is applied thereto, the at least one elastic member exerting a resisting force when its shape is changed.

9. The electrical generator system according to claim 8, wherein the elastic member comprises a tube spring.

* * * * *